United States Patent
Hammon et al.

(10) Patent No.: US 9,499,969 B2
(45) Date of Patent: Nov. 22, 2016

(54) SYSTEM AND METHOD FOR RECOVERY OF LIQUID OR FREE-FLOWING CHEMICALS

(71) Applicant: BASF SE, Ludwigshafen (DE)

(72) Inventors: Ulrich Hammon, Mannheim (DE); Thomas Walter, Hassloch (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/661,462

(22) Filed: Mar. 18, 2015

(65) Prior Publication Data

US 2015/0267391 A1 Sep. 24, 2015

Related U.S. Application Data

(60) Provisional application No. 61/954,650, filed on Mar. 18, 2014.

(30) Foreign Application Priority Data

Mar. 18, 2014 (DE) .................. 10 2014 103 692

(51) Int. Cl.
*E03F 5/10* (2006.01)
*E03F 5/22* (2006.01)
*B08B 9/08* (2006.01)

(52) U.S. Cl.
CPC .............. *E03F 5/105* (2013.01); *B08B 9/08* (2013.01); *E03F 5/22* (2013.01); *Y10T 137/0318* (2015.04); *Y10T 137/86035* (2015.04)

(58) Field of Classification Search
CPC ............ E03F 5/105; E03F 5/22; B08B 9/08; Y10T 137/0318; Y10T 137/86035
USPC ................ 137/255, 256, 263, 266
See application file for complete search history.

(56) References Cited

U.S. PATENT DOCUMENTS 2,779,476 A * 1/1957 Barker .................. G01N 33/04
137/256
3,428,072 A * 2/1969 Welch .................... A23C 3/033
137/113

(Continued)

FOREIGN PATENT DOCUMENTS

EP    1 705 170 A1    9/2006

OTHER PUBLICATIONS

International Search Report and Written Opinion issued Jun. 5, 2015 in PCT/EP2015/054964 (with English Translation of Categories of Cited Documents).

(Continued)

*Primary Examiner* — Kevin Lee
(74) *Attorney, Agent, or Firm* — Oblon, McClelland, Maier & Neustadt, L.L.P.

(57) ABSTRACT

The present invention describes a system (1) for recovering liquid or free-flowing chemicals in a chemical plant (3), comprising
at least two plant sections (3a, 3b),
for each plant section (3a, 3b) at least one connecting device (5a, 5b) arranged at the lowest point,
at least one common collecting line (7) which runs beneath the connecting devices (5a, 5b) and connects them to one another,
at least one collecting vessel (9) arranged at the same height as or higher than the at least two plant sections (3a, 3b) and above the collecting line (7),
at least one pump (11) provided in the collecting line (7) between the connecting devices (5a, 5b) and the collecting vessel (9) for drawing off the at least one liquid or free-flowing chemical combined in the collecting line (7) and introducing it into the collecting vessel (9).

17 Claims, 1 Drawing Sheet

(56) References Cited

U.S. PATENT DOCUMENTS

| | | | |
|---|---|---|---|
| 3,434,430 A * | 3/1969 | Berman et al. | F04D 9/008 137/115.13 |
| 4,823,986 A * | 4/1989 | Pearce, III | B65D 83/28 137/67 |
| 8,198,392 B2 | 6/2012 | Matsuo et al. | |
| 2005/0167362 A1 | 8/2005 | Sakakura et al. | |
| 2008/0210262 A1 | 9/2008 | Lauzon | |
| 2009/0111954 A1 | 4/2009 | Matsuo et al. | |

OTHER PUBLICATIONS

U.S. Appl. No. 14/737,025, filed Jun. 11, 2015, Hammon, et al.

\* cited by examiner

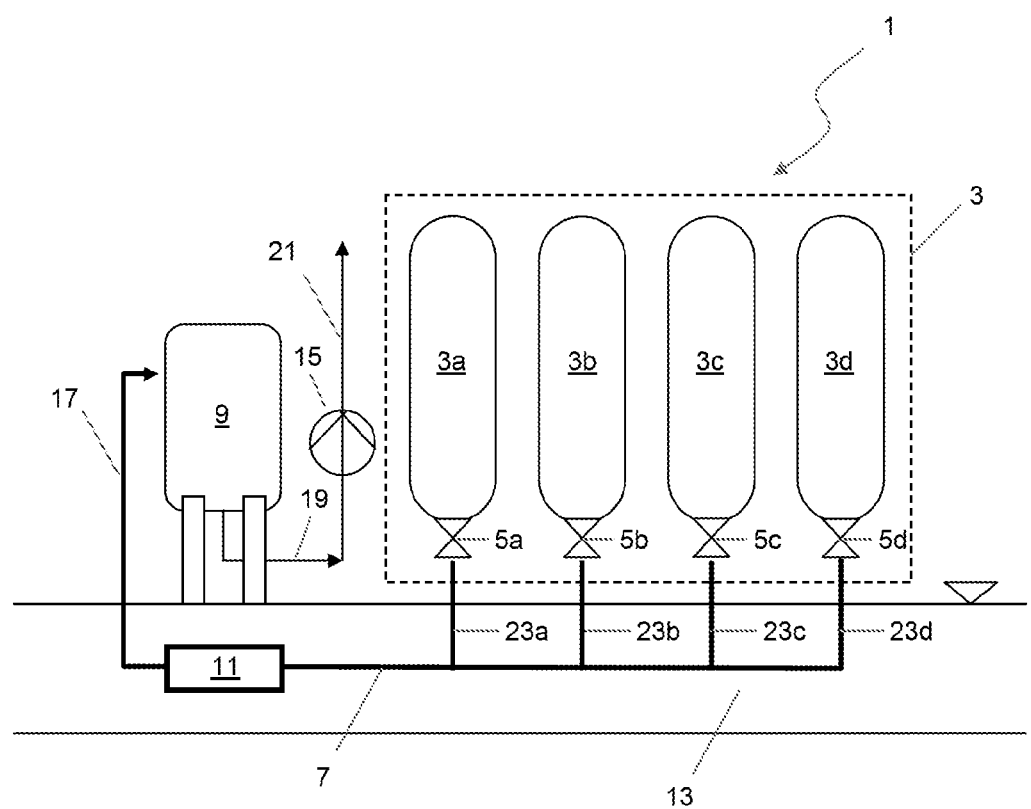

SYSTEM AND METHOD FOR RECOVERY OF LIQUID OR FREE-FLOWING CHEMICALS

CONTINUING APPLICATION INFORMATION

This patent application claims the benefit of U.S. provisional patent application Ser. No. 61/954,650 and DE patent application Serial Number DE 10 2014 103 692.1, both filed on Mar. 18, 2014, incorporated in their entirety herein by reference.

BACKGROUND OF THE INVENTION

1. Field of the Invention

The present invention relates to a system and a method for recovery of liquid or free-flowing chemicals in chemical plants.

2. Description of the Background

Methods and apparatuses for recovery of chemicals in chemical plants are known in principle in the prior art. For instance, EP 1 705 170 A1 describes a recovery method for liquid chemical products in plants. In this method, residues of liquid chemical products which remain in plants on a chemical production site are recovered.

Specifically, the chemical products are collected from the individual plants via exit lines at the bases thereof, and passed by their own force of gravity into a combined inclined collecting line arranged beneath the plants. By the force of gravity, the chemical products flow through the inclined collecting line into a collecting vessel arranged beneath the inclined collecting line.

Methods and plants of this kind are only of limited suitability for a number of applications, especially where products having relatively high viscosity are to be recovered or where different chemicals can be collected from one plant. Examples of these are product residues in a plant which are drawn off before a cleaning fluid flushes the plant, and the latter is likewise to be recovered.

For recovery of chemicals of relatively high viscosity, either sufficient time is required for them to be able to flow into the collecting vessel or the inclined collecting line has to have a comparatively high gradient. The latter variant places high demands on the plant construction, since either the plants have to be built upward or the collecting line along with the collecting vessels have to be provided at greater depth in the ground.

SUMMARY OF THE INVENTION

Against this background, it is an object of the present invention to provide a system and a method of recovering liquid or free-flowing chemicals in a chemical plant, with which the disadvantages of the prior art are overcome. More particularly, one aim is to ensure simple and reliable recovery of the liquid or free-flowing chemicals.

This object is achieved by a system (1) for recovering liquid or free-flowing chemicals in a chemical plant (3), comprising at least two plant sections (3a, 3b) of the plant (3), for each plant section (3a, 3b) at least one connecting device (5a, 5b) arranged at the lowest point in each plant section (3a, 3b), at least one common collecting line (7) which runs beneath the connecting devices (5a, 5b) and connects them to one another, at least one collecting vessel (9) arranged at the same height as or higher than the at least two plant sections (3a, 3b) and above the collecting line (7), at least one pump (11) provided in the collecting line (7) between the connecting devices (5a, 5b) and the collecting vessel (9) for drawing off the at least one liquid or free-flowing chemical combined in the collecting line (7) and introducing it into the collecting vessel (9).

By means of the inventive system (1), it is possible to execute the inventive method of recovering liquid or free-flowing chemicals in a chemical plant (3), comprising the steps of a) drawing off at least one liquid or free-flowing chemical from at least two plant sections (3a, 3b) of the plant (3), in each case through a connecting device (5a, 5b) arranged at the lowest point in each plant section (3a, 3b), b) combining the liquid or free-flowing chemicals drawn off in this way in at least one common collecting line (7) which runs beneath the connecting devices (5a, 5b) and connects them to one another, c) introducing the at least one liquid or free-flowing chemical combined in the collecting line (7) in at least one collecting vessel (9) arranged at the same height as the at least two plant sections (3a, 3b) and above the collecting line (7), wherein the drawing-off of the at least one liquid or free-flowing chemical in step a) and the introduction into the at least one collecting vessel (9) in step c) are executed by means of at least one pump (11).

DETAILED DESCRIPTION OF THE INVENTION

If the description which follows, in connection with the inventive system (1), also cites method features, these preferably relate to the inventive method which is defined in more detail below.

The inventive system (1) is notable firstly in that it is space-saving and secondly in that it requires only minor, if any, excavation measures for construction thereof. The inventive system (1) can therefore be retrofitted, depending on the configuration of a chemical plant (3).

With the inventive system (1), it is additionally possible to remove liquid or free-flowing chemicals from the plant sections (3a, 3b) either at different places or at different times. This takes account, for example, of the fact that individual plant sections (3a, 3b) have to be flushed at different times. By using the pump 11, emptying can be accomplished rapidly, which is advantageous for the overall availability of the plant. It is particularly advantageous when the plant section from which the liquid is to be emptied can be put under slightly elevated pressure.

The invention is described in more detail hereinafter.

The present invention firstly provides a system (1) for recovering liquid or free-flowing chemicals in a chemical plant (3), comprising at least two plant sections (3a, 3b) of the plant (3), for each plant section (3a, 3b) at least one connecting device (5a, 5b) arranged at the lowest point in each plant section (3a, 3b), at least one common collecting line (7) which runs beneath the connecting devices (5a, 5b) and connects them to one another, at least one collecting vessel (9) arranged at the same height as or higher than the at least two plant sections (3a, 3b) and above the collecting line (7), at least one pump (11) provided in the collecting line (7) between the connecting devices (5a, 5b) and the collecting vessel (9) for drawing off the at least one liquid or free-flowing chemical combined in the collecting line (7) and introducing it into the collecting vessel (9).

The term "liquid or free-flowing chemicals" is understood to mean any liquids which are used for preparation and workup of a product and for cleaning of the plant (3). Examples are given below in a preferred embodiment.

The term "chemical plant" comprises all kinds of plants and/or apparatuses in which liquid or free-flowing chemicals are processed. As well as the wide variety of different reactors, these may, for example, be distillation columns, extraction apparatuses, crystallizers, heat exchangers, reactors or vessels.

According to the present invention, the plant (3) is divided into at least two plant sections (3a, 3b), and the two plant sections (3a, 3b) may have the same function, for example two reactors run in parallel. Alternatively, the respective plant sections (3a, 3b) may constitute different stages of a chemical preparation process, for example a reactor with connected distillation column.

At the lowest point in each plant section (3a, 3b) is arranged a connecting device (5a, 5b) which may, for example, be a valve, vane, tap or flap. The lowest point in a plant section (3a, 3b) may be formed, for example, by a column bottom.

In the system (1), at least one collecting vessel (9) is provided, arranged at the same height as the at least two plant sections (3a, 3b) and above the collecting line (7). The expression "at the same height" in the context of the present invention means that the collecting vessel (9) is not arranged below ground level and hence does not require an excavation measure. Instead, the collecting vessel (9) is arranged above ground and is incorporated into the plant (3). The collecting vessel (9) may be a tank arranged between or alongside the particular plant sections (3a, 3b). Thus, the collecting vessel (9) is at the same height as the plant sections (3a, 3b); at least the lowest point therein may be at the height of the lowest point in the corresponding plant sections (3a, 3b).

It has been found to be advantageous for the inventive system (1) when the collecting line (7) running beneath the at least two plant sections (3a, 3b) runs above the ground and/or in a sewer (13). In contrast to underground laying, as described in the prior art, an above-ground collecting line (7) offers the possibility of problem-free retrofitting of existing chemical plants (3). Moreover, the maintenance and cleaning of the collecting line (7) is facilitated by laying it above the ground.

In an alternative or supplementary embodiment, the collecting line (7) may run beneath the at least two plant sections (3a, 3b) in a sewer (13). Such a sewer may either likewise be arranged above the ground and accommodate the collecting line (7), for example for mechanical protection thereof. However, the sewer (13) may also easily run beneath ground level, such that a level site within the plant (3) is provided.

By virtue of a dedicated collecting line (7) and/or a dedicated collecting vessel (9) being provided, in a further embodiment, for each of said liquid or free-flowing chemicals, the recovery of the chemicals is simplified. For example, a product residue can first be drawn off from the plant (3) and collected in a dedicated collecting vessel (9). Thereafter, for example, the reactor is flushed and then the flushing medium is drawn off via the connecting device (5a, 5b), likewise through the collecting line (7), and collected in a further collecting vessel (9).

The system may be designed such that, proceeding from the connecting device (5a, 5b), a single collecting line (7) is provided in which a distributor is provided upstream of the pump (11), in order to conduct the various liquid or free-flowing chemicals into the different collecting vessels (9). A somewhat more complex solution is the provision of a dedicated collecting line (7) for each liquid or free-flowing chemical.

The liquid or free-flowing chemicals comprise especially products, by-products, unreacted reactants, cleaning agents, solvents, extraction media and/or flushing media.

It has been found to be advantageous for the further use and/or treatment of the liquid or free-flowing chemicals when the at least one collecting vessel (9) is followed downstream by a second pump (15) provided for conduction of the respective liquid or free-flowing chemical onward into a utilization, recycling and/or disposal operation. It is possible here for each of the collecting vessels (9) to have a dedicated pump (15). This somewhat higher apparatus complexity is compensated for by the fact that there is no need to clean the pump after each passage of one of the liquid or free-flowing chemicals. If only product residues and, for example, flushing media are drawn off, a single pump (15) is sufficient.

In a specific embodiment of the inventive system (1), the pump (11) is a self-priming pump. Self-priming pumps have the advantage over normal centrifugal pumps that the suction-side line need not be filled with liquid in order to start the conveying operation.

It is also possible to convey gas/liquid mixtures, which is advantageous especially at the end of the emptying operation.

It has been found to be advantageous when the system (1) is intrinsically closed. An intrinsically closed system (1) is advisable particularly when the liquid or free-flowing chemicals are harmful to health, toxic, volatile, combustible, air-sensitive, highly odorous. Thus, the liquid or free-flowing chemicals do not get out, and they are not contaminated by the environment.

The present invention further provides a method of recovering liquid or free-flowing chemicals in a chemical plant (3) by means of the inventive system (1) defined above. The method comprises the steps of a) drawing off at least one liquid or free-flowing chemical from at least two plant sections (3a, 3b) of the plant (3), in each case through a connecting device (5a, 5b) arranged at the lowest point in each plant section (3a, 3b), b) combining the liquid or free-flowing chemicals drawn off in this way in at least one common collecting line (7) which runs beneath the connecting devices (5a, 5b) and connects them to one another, c) introducing the at least one liquid or free-flowing chemical combined in the collecting line (7) in at least one collecting vessel (9) arranged at the same height as or higher than the at least two plant sections (3a, 3b) and above the collecting line (7), wherein the drawing-off of the at least one liquid or free-flowing chemical in step a) and/or the introduction into the at least one collecting vessel (9) in step c) is/are executed by means of at least one pump (11).

The inventive method has essentially the same advantages as the above-described system (1). More particularly, it is possible by the inventive method to remove liquid or free-flowing chemicals from the plant sections (3a, 3b) either at different places or at different times, and to accelerate emptying operations.

It has been found to be advantageous for the seamless running of the method when the at least one liquid or free-flowing chemical is supplied from the collecting vessel (9) by means of a second pump (15) to a utilization, recycling and/or disposal operation. If the collecting vessel is installed in the form of an elevated vessel, the withdrawal from the vessel may possibly also be effected without a pump (15), utilizing the hydrostatic head as the driving force for conveying.

The present invention further provides for the use of the system (1), as defined above, in conjunction with a plant (3) for preparation of (meth)acrolein, (meth)acrylic acid and/or (meth)acrylic ester for recovery of (meth)acrolein, (meth)acrylic acid, (meth)acrylic ester, wash water, solvents such as Diphyl®, biphenyl, biphenyl ether, dimethyl phthalate, diethyl phthalate and/or mixtures thereof. Diphyl® is a commercial product from Lanxess and is a high-temperature heat carrier composed of a diphenyl oxide/biphenyl eutectic.

Further aims, features, advantages and possible uses are apparent from the description of working examples of the present invention which follows, with reference to the FIGURE. All the features described and/or shown in the form of images, alone or in any combination, constitute the subject matter of the present invention, even irrespective of the combination thereof in the claims or the dependency references thereof.

BRIEF DESCRIPTION OF THE FIGURE

The FIGURE shows a schematic diagram of the system (1) in one embodiment of the invention.

The FIGURE shows a schematic of an inventive system 1 for recovery of liquid or free-flowing chemicals in a chemical plant 3. In this embodiment, the chemical plant 3 is formed by four plant sections 3a, 3b, 3c, 3d. The number of plant sections is at least two, and in principle does not have any upper limit. For reasons of industrial viability, however, a maximum number of 50 has been found to be advisable. The plant sections 3a, 3b, 3c, 3d may be identical or different apparatuses within the chemical plant 3. The plant sections 3a, 3b, 3c, 3d may, for example, be reactors, distillation columns, extraction apparatuses, crystallizers, heat exchangers, pumps, vessels or pipeline connections. It is also possible for a plurality of different plant sections 3a, 3b, 3c, 3d to be arranged within one chemical plant 3, for example two reactors and two distillation columns.

Every plant section 3a, 3b, 3c, 3d has a connecting device 5a, 5b, 5c, 5d, arranged at the lowest point in the respective plant section 3a, 3b, 3c, 3d. The connecting devices 5a, 5b, 5c, 5d are especially valves, vanes, taps or flaps, from which the liquid or free-flowing chemical can be discharged from the respective plant section 3a, 3b, 3c, 3d. In the embodiment of the FIGURE, for each connecting device 5a, 5b, 5c, 5d, a short connecting line 23a, 23b, 23c, 23d is provided, which leads into the common collecting line 7.

In the FIGURE, the collecting line 7 runs within a sewer 13. This sewer 13 may be arranged above the ground and accommodate the collecting line 7 and further devices. By means of a first pump 11, especially a self-priming pump, the liquid or free-flowing chemical is actively pumped out of the collecting line 7 and fed by means of a connecting line 17 to the collecting vessel 9.

If different liquid or free-flowing chemicals are being processed or used in the respective plant sections 3a, 3b, 3c, 3d, a dedicated collecting vessel 9 may be provided in each case. For example, product residues from the plant sections 3a, 3b, 3c, 3d can first be pumped through the collecting line 7 into a first collecting vessel 9. After the purging of the plant section 3a, 3b, 3c, 3d, the flushing medium can then likewise be pumped away through the collecting line 7. It is advantageous here when a second collecting vessel 9 is provided, into which pumped introduction is effected through the connecting line 17 and a distributor not shown in the FIGURE.

In the FIGURE, downstream of the respective collecting vessel 9 is a line 19 which, by means of a second pump 15, pumps the particular liquid or free-flowing chemical out of the collecting vessel 9 again and sends it via a connecting line 21 to further use, for example a utilization, a recycling operation and/or a disposal operation. The pump may be an immersed pump, where the drive motor is in the dry position and the pump housing is flooded by the conveying medium. Since solids are frequently present in the liquid discharged in emptying operations, an open impeller has been found to be advantageous in the pump 15.

In a further embodiment, the plant sections 3a, 3b, 3c, 3d several connecting devices 5a, 5b, 5c, 5d at different points can be provided. This is advantageous when, in the respective plant section 3a, 3b, 3c, 3d, liquid or free-flowing chemicals collect at more than one point, for example at the lowest point in the column bottom, and product residues at a somewhat higher tray. As already mentioned, the recovery in such a case can take place at different times.

The inventive system 1 and the inventive method of recovering liquid or free-flowing chemicals are especially suitable in plants for preparing acrylic acid.

The invention claimed is:

1. A system for recovering liquid or free-flowing chemicals in a chemical plant, the system comprising:
    at least two plant sections of the plant, wherein the at least two plant sections are at least two reactors run in parallel or constitute different stages of a chemical preparation process;
    for each plant section at least one connecting device arranged at a lowest point in each plant section;
    at least one common collecting line which runs beneath the connecting devices and connects them together;
    at least one collecting vessel arranged at the same height as or higher than the at least two plant sections and above the collecting line; and
    at least one pump provided in the collecting line between the connecting devices and the collecting vessel for drawing off at least one liquid or free-flowing chemical combined in the collecting line and introducing the at least one liquid or free-flowing chemical into the collecting vessel.

2. The system according to claim 1, wherein the collecting line running beneath the at least two plant sections runs above ground or in a sewer.

3. The system according to claim 1, wherein a dedicated collecting line or a dedicated collecting vessel is provided for each of the liquid or free-flowing chemicals.

4. The system according to claim 1, wherein the liquid or free-flowing chemicals comprise products, by-products, unreacted reactants, cleaning agents, solvents, extraction media or flushing media.

5. The system according to claim 1, wherein the at least one collecting vessel is followed downstream by a second pump provided for conduction of the at least one liquid or free-flowing chemical onward into a utilization, recycling or disposal operation.

6. The system according to claim 1, wherein the pump is a self-priming pump.

7. The system according to claim 1, wherein the system is intrinsically closed.

8. The system according to claim 1, wherein the liquid or free-flowing chemical is at least one selected from the group consisting of (meth)acrolein, (meth)acrylic acid and a (meth)acrylic ester.

9. The system according to claim 1, wherein the at least two plant sections are at least two reactors run in parallel.

10. The system according to claim 1, wherein the at least two plant sections constitute different stages of a chemical preparation process.

11. The system according to claim 1, wherein the collecting vessel is located above ground.

12. The system according to claim 1, wherein the connecting device is a valve, vane, tap or flap.

13. A method of recovering liquid or free-flowing chemicals in a chemical plant with the system according to claim 1, the method comprising:
   a) drawing off at least one liquid or free-flowing chemical from at least two plant sections of the plant, in each case through a connecting device arranged at the lowest point in each plant section, wherein the at least two plant sections are at least two reactors run in parallel or constitute different stages of a chemical preparation process;
   b) combining the drawn off liquid or free-flowing chemicals in at least one common collecting line which runs beneath the connecting devices and connects them together;
   c) introducing the at least one liquid or free-flowing chemical combined in the collecting line in at least one collecting vessel arranged at the same height as or higher than the at least two plant sections and above the collecting line,
   wherein at least one of the drawing-off of the at least one liquid or free-flowing chemical in step a) or the introduction into the at least one collecting vessel in step c) is executed with the at least one pump.

14. The method according to claim 13, wherein the at least one liquid or free-flowing chemical from the collecting vessel is supplied with a second pump to a utilization, recycling or disposal operation.

15. The method of claim 13, wherein the liquid or free-flowing chemical is at least one selected from the group consisting of (meth)acrolein, (meth)acrylic acid, a (meth)acrylic ester, a wash water, and a solvent.

16. The method of claim 13, wherein the liquid or free-flowing chemical is at least one selected from the group consisting of biphenyl, biphenyl ether, dimethyl phthalate, and diethyl phthalate.

17. The system according to claim 1, wherein the collecting line running beneath the at least two plant sections runs above around.

* * * * *